United States Patent [19]

Jurrens et al.

[11] 3,917,551

[45] Nov. 4, 1975

[54] HOT MELT ADHESIVE

[75] Inventors: Lawrence D. Jurrens; Leo L. Gingerich, both of Bartlesville, Okla.

[73] Assignee: Phillips Petroleum Company, Bartlesville, Okla.

[22] Filed: June 7, 1974

[21] Appl. No.: 477,177

[52] U.S. Cl....... 260/27 BB; 260/33.6 AQ; 260/888
[51] Int. Cl.² ..................... C08K 5/01; C08L 93/00
[58] Field of Search...... 260/27 R, 33.6 UA, 27 BB, 260/33.6 AQ, 888

[56] References Cited
UNITED STATES PATENTS

| | | | |
|---|---|---|---|
| 3,035,953 | 5/1962 | Arnold | 260/85.1 |
| 3,239,478 | 3/1966 | Harlan | 260/27 R |
| 3,554,911 | 1/1971 | Schiff et al. | 252/59 |
| 3,630,980 | 12/1971 | Russell | 260/27 |
| 3,741,931 | 6/1973 | Martin et al. | 260/41.5 R |

Primary Examiner—Donald E. Czaja
Assistant Examiner—H. H. Fletcher

[57] ABSTRACT

A hot melt adhesive is disclosed consisting essentially of rubber, tackifier and liquid polybutadiene as the extender-plasticizer.

9 Claims, No Drawings

HOT MELT ADHESIVE

This invention relates to the art of adhesives.

More specifically, the invention relates to hot melt adhesives consisting essentially of a polymer, a tackifier and an extender-plasticizer.

BACKGROUND OF THE INVENTION

Hot melt adhesives are well known in the art. Usually they comprise a polymer, e.g. a rubber, a tackifier, e.g. a resin, and an extender oil, e.g. a mineral oil. Whereas some of these adhesives have proven to be very successful, some properties remain to be enhanced. Among these properties to be improved are the tack, the tack retention, and the stability.

THE INVENTION

It is thus one object of this invention to provide new hot melt adhesives.

Another object of this invention is to provide new hot melt adhesives with improved initial tack, tack retention, and stability.

Further objects, aspects, advantages and embodiments of this invention will become apparent from the following detailed description of the invention and the appended claims.

In accordance with the present invention, we have discovered that the use of a liquid polyalkadiene as the extender-plasticizer in hot melt adhesives result in an adhesive system having improved tack and tack retention properties.

For the purposes of this invention all hydrogenated copolymers of a substituted or unsubstituted alkadiene having 4–12 carbon atoms and a substituted or unsubstituted vinyl-substituted aromatic monomer having 8–16 carbon atoms can be used as the polymer or the rubber in the hot melt adhesive. The preferred copolymer is a copolymer of butadiene or isoprene and styrene.

The degree of hydrogenation of the polymer preferably is such that the remaining olefinic unsaturation is less than about 3 per cent of the original olefinic unsaturation. Polymers having about 1 per cent original olefinic unsaturation have been successfully tested in hot melt adhesives and are therefore presently preferred.

In one presently preferred embodiment of this invention there is used as the polymer rubber a copolymer of 41 weight per cent butadiene and 59 weight per cent styrene containing not more than about 20 weight per cent of the total rubber in polystyrene blocks. The preparation of this rubber is described in Example V, column 6, lines 29–50 of U.S. Pat. No. 3,554,911.

For the purposes of this invention, any tackifier known in the art can be employed. Examples for such tackifiers are pentaerythritol ester of hydrogenated rosin, e.g. Foral 85 or 105 (trade-mark) as sold by Hercules Inc.; thermoplastic olefin resin, e.g. Super Sta-Tac 80 (trade-mark) sold by Reichhold Chemicals, Inc.; thermoplastic hydrocarbon resins, e.g. Schenectady CRJ-683 (trade-mark) sold by Schenectady Chemical Co.; glycerol ester of hydrogenated rosin, e.g., Staybelite Ester 10 (trade-mark) sold by Hercules Powder, Inc. Wood resins, resin esters, tackifiers of the polyterpene and the coumarine indene type could also be used. Presently preferred are the thermoplastic olefin resin tackifiers such as the product sold under the name of Super Sta-Tac 80 (trade-mark) by Reichhold Chemicals, Inc.

The liquid polyalkadienes useful in accordance with this invention as extender-plasticizer are liquid polymers of alkadienes having 4–12 carbon atoms per molecule. The weight average molecular weight is in the range of about 500 to about 10,000. With the exception of the C=C double bonds such polyalkadienes are free of functional groups which might cause crosslinking or other reactions deteriorating the desired long-term stability of the adhesive. The polyalkadienes useful in accordance with this invention are liquid at ambient temperatures.

These polyalkadienes are prepared in conventional manners well known in the art. The alkadiene is, for instance, polymerized in a solvent in the presence of e.g. an alkyllithium initiator and the reaction is terminated by adding a proton donor, e.g. water, alcohol, hydrochloric acid or a fatty acid.

The preferred polyalkadienes are conjugated polyalkadienes, especially polybutadiene, having a weight average molecular weight of about 2,000 to about 8,000 and a viscosity of about 75 to about 125 poise at 77°F. Presently most preferred is a polybutadiene having no functional groups (with the exception of the C=C double bonds) and being manufactured and sold by Phillips Petroleum Company under the trademark Butarez NF (NF standing for "nonfunctional"). This polybutadiene is prepared by polymerizing butadiene dissolved in cyclohexane in the presence of butyllithium as the initiator using about 10 to about 30 millimoles of butyllithium per 100 grams of butadiene and carrying out the reaction under polymerization conditions and in a nitrogen atmosphere. The reaction is terminated by adding hydrochloric acid which introduces a hydrogen instead of the lithium atom into the polymer.

The adhesives of this invention consist of a polymer, a tackifier, and a polyalkadiene. In addition, small quantities of the usual additives such as antioxidants, stabilizers or pigments can be present in the adhesive system. The preferred range of components for an adhesive recipe is shown in the following table:

TABLE

| Ingredients | Parts by weight |
|---|---|
| Copolymer | about 40 to about 70 |
| Tackifier | about 50 to about 90 |
| Liquid polyalkadiene | about 10 to about 30 |
| Additives (stabilizers, pigments, antioxidants) | about 1 to about 10 (optional) |

The preparation of the adhesives is carried out by any conventional method. For example, the ingredients are put into a mixer, liquefied and blended thoroughly. The sequence of adding the ingredients is not particularly critical.

The invention will be more fully understood from the following examples.

EXAMPLE I

In the first run of this example an adhesive for comparison purposes was made which contained no liquid polyalkadiene. Into a Baker-Perkins sigma blade mixer 60 grams of a hydrogenated butadienestyrene copolymer having 41 weight per cent butadient and butadiene 59 weight per cent styrene units and being hydrogenated to about 1 per cent olefinic unsaturation, and 80 grams of a thermoplastic olefinic resin sold by Reichhold Chemicals, Inc., White Plains, New York, under the trademark Super Sta-Tac 80 (RCI Product 47-403) were charged and heated to about 390°F. One gram of dilaurylthiodipropionate (DLTDP), 4 grams of an alkylated, arylated bis-phenolic phosphite sold under the name of Agerite Geltrol by R. T. Vanderbilt Co., Inc. New York, New York and 20 grams of mineral oil were added and the charge was stirred for about 1 hour at 390°F under nitrogen.

In the second run the same operation was carried out as in the first run, however instead of the mineral oil, 20 grams of a liquid polybutadiene was used. The liquid polybutadiene was the product manufactured and sold by Phillips Petroleum Company under the trademark Butarez NF. The liquid polybutadiene has a viscosity of 86 poise at 77°F, a specific gravity of 0.8965, and a weight average molecular weight of about 5,000.

The adhesives thus prepared were tested to determine tack, tack retention and viscosity. The tack was measured with a Polyken Probe Tack Tester made and sold by Testing Machines, Inc., Mineola, New York immediately after the blending was finished and for a second time after aging the sample for 24 hours at 350°F. The viscosity was measured on a Brookfield Viscosimeter using spindle No. 4-27 at 350°F and 2.5 rpm, again immediately after blending and after 24 hours of aging at 350°F. The results of these tests are given in Table I.

Table I

| | Run | 1 | 2 |
|---|---|---|---|
| Recipe: (parts by weight) | Hydrogenated butadiene/styrene copolymer | 60 | 60 |
| | Super Sta-Tac 80 Tackifier | 80 | 80 |
| | Mineral Oil | 20 | 0 |
| | Liquid Polybutadiene | 0 | 20 |
| | DLTDP | 1 | 1 |
| | Agerite Geltrol | 4 | 4 |
| Test Results | Tack (g) initial | 547 | 867 |
| | Tack (g) after 24 hrs. at room temperature | 170 | 1096 |
| | Viscosity, initial (cps) | 9000 | 12700 |
| | Viscosity after 24 hrs. age at 350°F | 9400 | 13200 |

The results of Table I show that both initial tack and tack retention are considerably improved by the use of a liquid polybutadiene instead of the usually employed mineral oil as extender-plasticizer in the adhesive formulation.

EXAMPLE II

In runs 3 and 4 of this example the operation of run 1 of Example 1 was repeated starting from a different batch of the same rubber used in run 1 of Example I. Run 3 is a comparative run whereas in run 4 a smaller quantity of liquid polybutadiene was employed instead of the mineral oil used as the extender-plasticizer in run 3. The tack was measured for these samples immediately after blending; after 24, 72 and 168 hours, respectively, of aging at room temperature; and after 24, 72 and 168 hours, respectively, aging at 158°F. The results and recipes of these runs are shown in the following Table II.

Table II

| | Run No. | 3 | 4 |
|---|---|---|---|
| Recipe: (parts by weight) | Hydrogenated butadiene/styrene copolymer Super Sta-Tac 80 | 60 | 60 |
| | Tackifier | 80 | 80 |
| | Mineral Oil | 20 | 0 |
| | Liquid polybutadiene | 0 | 15 |
| | DLTDP | 1 | 1 |
| | Agerite Geltrol | 4 | 4 |
| Test Results | Tack (g) initial | 1037 | 1500 |
| | Tack after 24 hrs. at room temperature | 1023 | 1560 |
| | Tack after 72 hrs. at room temperature | 923 | 1560 |
| | Tack after 168 hrs. at room temperature | 950 | 1560 |
| | Tack after 24 hrs. at 158°F | 1170 | 1547 |
| | Tack after 72 hrs. at 158°F | 1170 | 1560 |
| | Tack after 168 hrs. at 158°F | 970 | 1517 |
| | Viscosity (initial, cps) | 8500 | 14200 |
| | Viscosity after 24 hrs. at 350°F | 8000 | 14500 |

The data of these runs, too, show that the initial tack and tack retention are considerably improved by the invention employing the liquid polybutadiene instead of the mineral oil as the extender-plasticizer in the adhesive formulation. It is to be kept in mind that in this example only 15 parts by weight of polybutadiene have been employed and the results are compared with an adhesive having 20 parts by weight of the mineral oil. The tack does not fall off after aging but remains very constant for the adhesive in accordance with this invention. In addition the results show that there is very little change in the viscosity if liquid polybutadiene is employed in accordance with the invention as the extender-plasticizer.

Reasonable variations and modifications which will be apparent to those skilled in the art can be made in this invention without departing from the spirit or scope thereof.

What is claimed is:

1. A hot melt adhesive composition consisting essentially of a hydrogenated copolymer of a substituted or unsubstituted alkadiene having 4–12 carbon atoms and a substituted or unsubstituted vinylsubstituted aromatic monomer having 8–16 carbon atoms per molecule wherein substantially all of the olefinic unsaturation is hydrogenated, leaving the aromatic unsaturation, a tackifier and about 10 to about 30 parts by weight per about 40 to about 70 parts by weight of the copolymer of a liquid polyalkadiene having alkadiene units of 4–12 carbon atoms per molecule, having a weight average molecular weight in the range of about 500 to about 10,000 and being substantially free of other functional groups than C=C double bonds.

2. A composition in accordance with claim 1 wherein the polyalkadiene has a weight average molecular weight of about 2,000 to about 8,000.

3. A composition in accordance with claim 1 wherein the alkadiene monomer of the copolymer is selected from the group consisting of butadiene and isoprene and the monovinyl-substituted aromatic monomer of the copolymer is styrene.

4. A composition in accordance with claim 3 wherein the polymer is a hydrogenated butadiene-styrene copolymer having a butadiene content of about 30 to about 44 weight percent and a styrene content of about 70 to about 56 weight percent.

5. A composition in accordance with claim 1 wherein the polyalkadiene is polybutadiene.

6. A composition in accordance with claim 5 wherein the polybutadiene has a weight average molecular weight of about 5,000 and a viscosity of about 75–125 poise at 77°F.

7. A hot melt adhesive composition according to claim 1 wherein said tackifier is selected from the group consisting of pentaerythritol ester of hydrogenated rosin, thermpolastic olefin resin tackifiers, thermoplastic hydrocarbon resin tackifiers, glycerol ester of hydrogenated rosin, wood resin tackfiers, resin ester tackifiers, polyterpene tackifiers and thermoplastic olefin resin tackifiers.

8. A composition in accordance with claim 7 comprising about 40 to about 70 parts by weight of said copolymer, about 50 to about 90 parts by weight of said tackifier, and about 10 to about 30 parts by weight of said liquid polyalkadiene.

9. A composition in accordance with claim 8 comprising about 1 to about 10 parts by weight of at least one additive selected from the group consisting of stabilizers, pigments, and antioxidants.

* * * * *